United States Patent [19]

Ueno

[11] Patent Number: 5,406,393
[45] Date of Patent: Apr. 11, 1995

[54] IMAGE PROCESSING APPARATUS WITH MEANS FOR INDICATING ERROR IN DATA RECEPTION

[75] Inventor: Fumihiro Ueno, Yokohama, Japan

[73] Assignee: Canon Kabushiki Kaisha, Tokyo, Japan

[21] Appl. No.: 150,240

[22] Filed: Nov. 9, 1993

Related U.S. Application Data

[63] Continuation of Ser. No. 644,606, Jan. 23, 1991, abandoned.

[30] Foreign Application Priority Data

Jan. 23, 1990 [JP] Japan ................................. 2-11851

[51] Int. Cl.⁶ ............................................. H04N 1/46
[52] U.S. Cl. ................................. 358/504; 358/529; 358/540
[58] Field of Search ................... 358/75, 401, 403, 405, 358/439, 468, 500–503, 529, 504, 540, 515, 296, 298

[56] References Cited

U.S. PATENT DOCUMENTS

| | | | |
|---|---|---|---|
| 4,656,505 | 4/1987 | Yamada et al. | 358/529 |
| 4,819,063 | 4/1989 | Sugiura et al. | 358/75 |
| 4,922,349 | 5/1990 | Abe et al. | 358/75 |
| 5,050,004 | 9/1991 | Morton, Jr. | 358/405 |
| 5,249,061 | 9/1993 | Nagashima et al. | 358/296 |

*Primary Examiner*—Stephen Brinich
*Assistant Examiner*—Jerome Grant, II
*Attorney, Agent, or Firm*—Fitzpatrick, Cella, Harper & Scinto

[57] ABSTRACT

An image processing apparatus comprises: a receiving circuit to receive image signals of a plurality of colors, in which the image signals is received for every color by an amount of one image formation unit such as one picture plane; a detector to detect whether the image signals have properly been received by the receiving circuit or not; and an image forming device to form a color image on the basis of the image signals, wherein the image forming process by the image forming device is executed in accordance with the result of the detection by the detector. Even if a communication error was generated, a good color image can be reproduced.

16 Claims, 17 Drawing Sheets

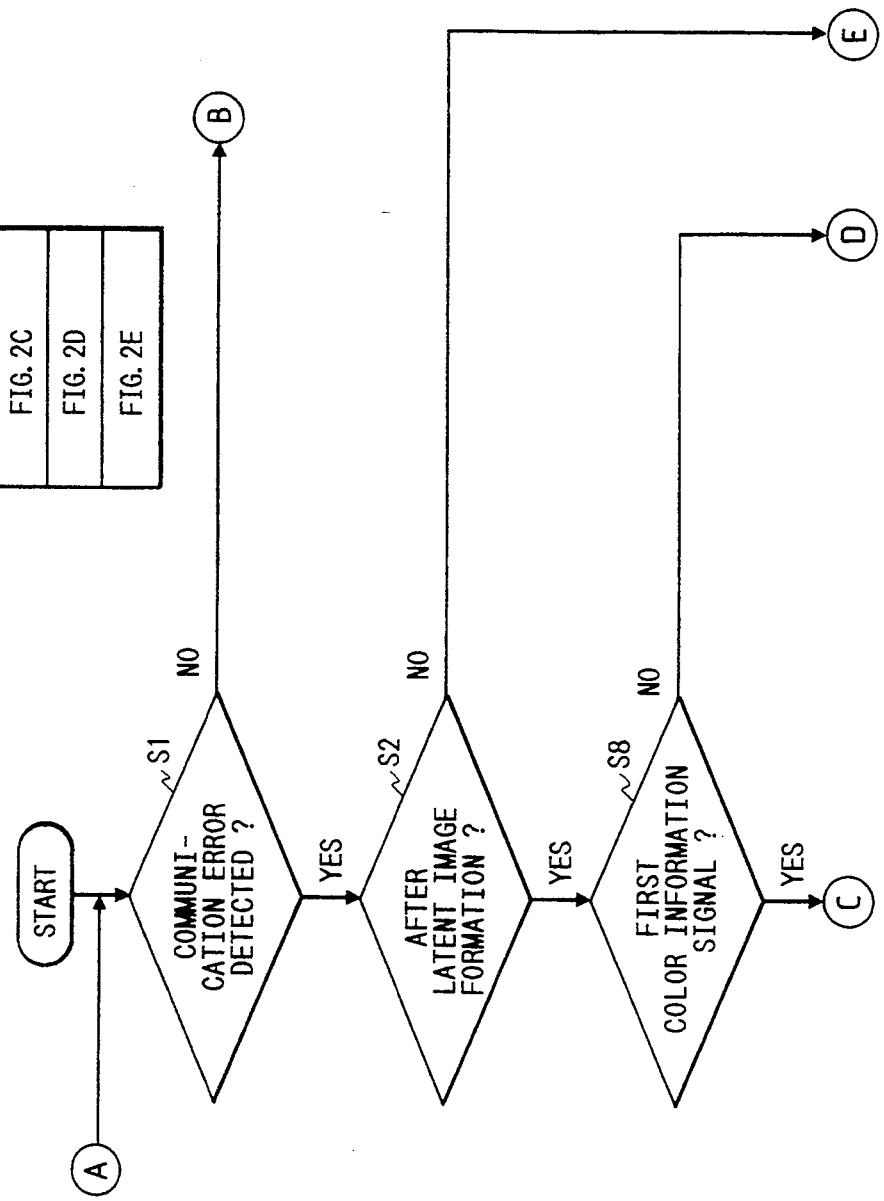

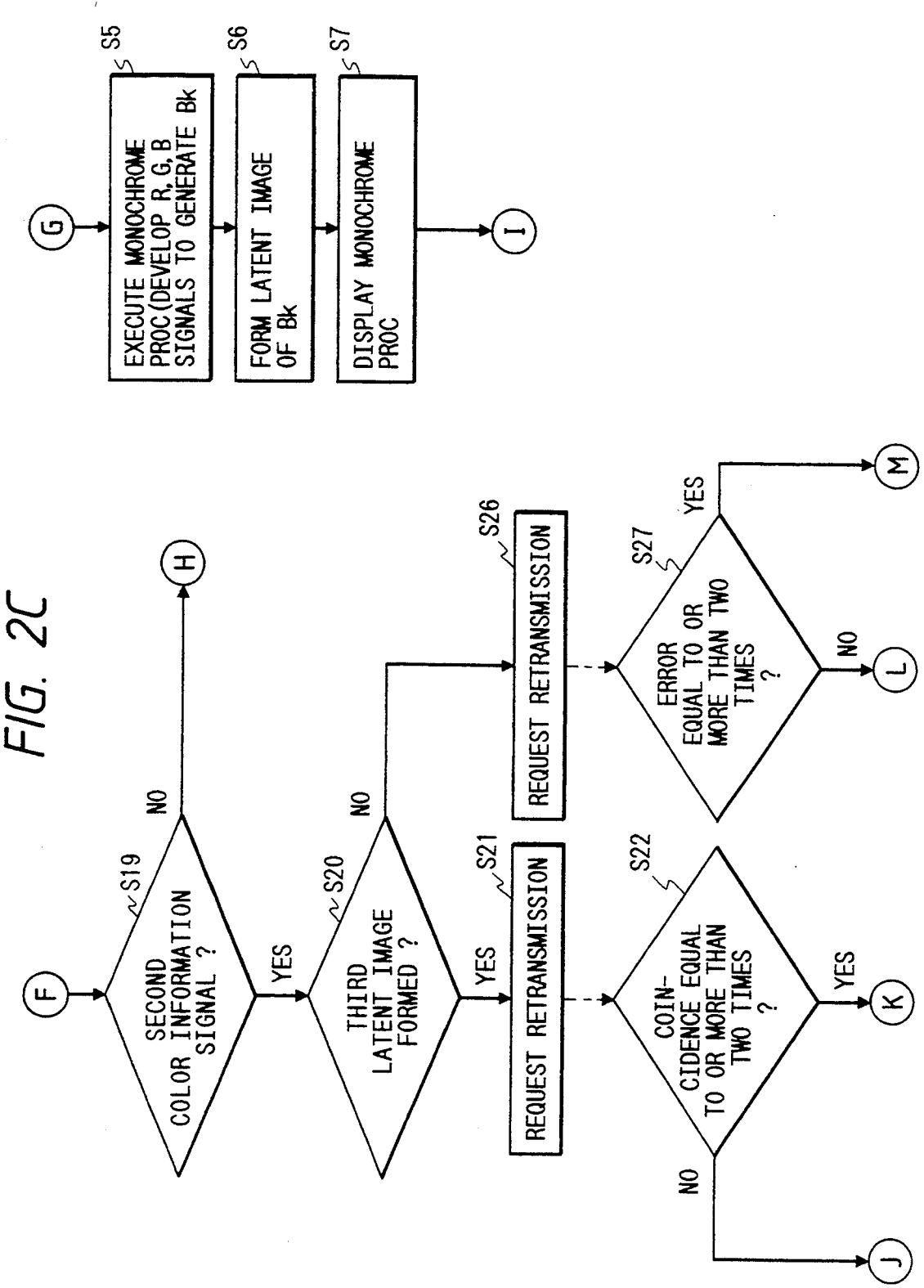

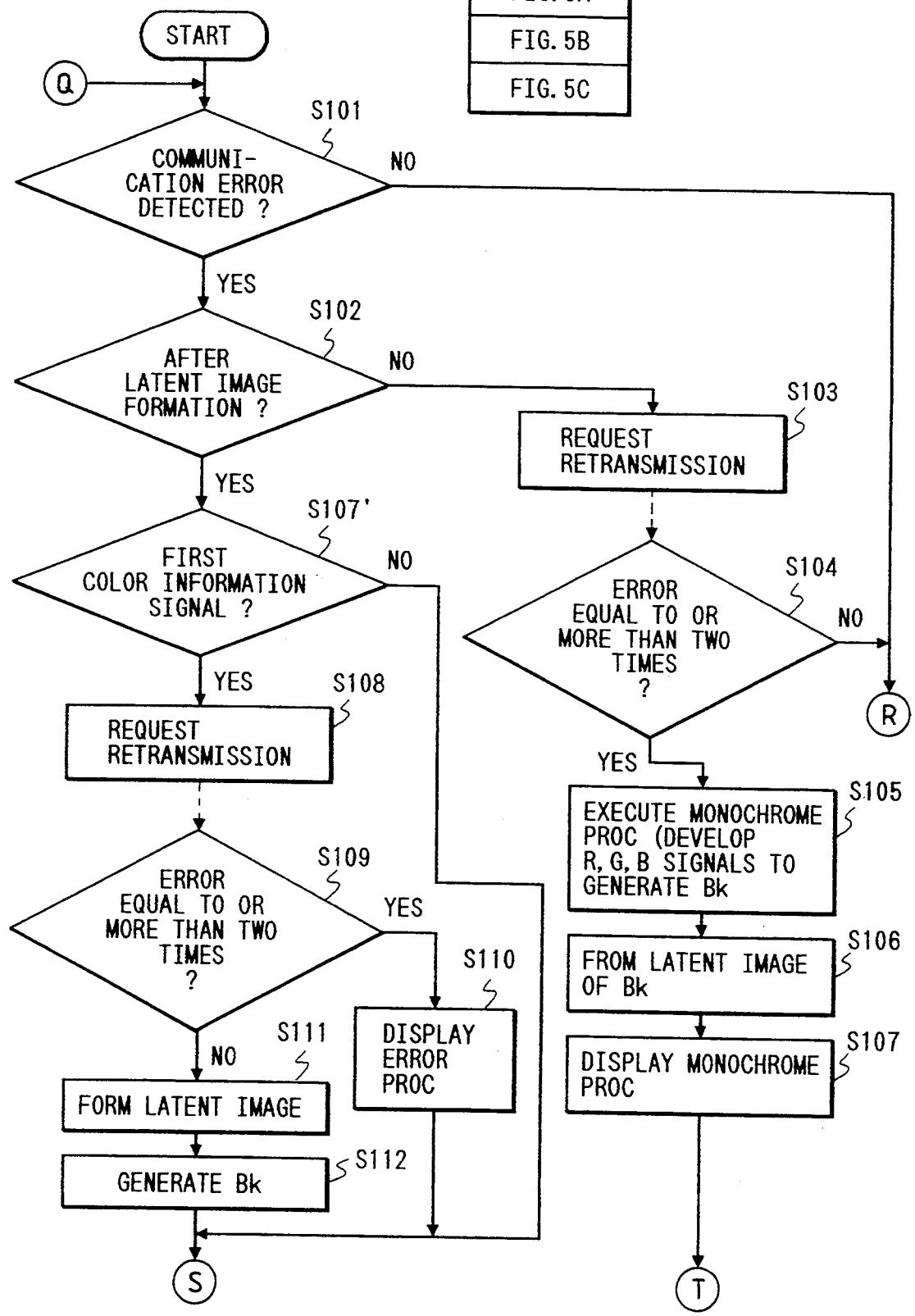

IMAGE PROCESSING APPARATUS WITH MEANS FOR INDICATING ERROR IN DATA RECEPTION

This application is a continuation of application Ser. No. 07/644,606 filed Jan. 23, 1991, now abandoned.

BACKGROUND OF THE INVENTION

1. Field of the Invention

The present invention relates to an image processing apparatus which can be used in a recording apparatus such as a color laser beam printer, color LED printer, or the like which forms a multicolor image on the basis of image signals regarding a plurality of color components.

2. Related Background Art

In recent years, the laser beam printer is widely used as an output apparatus of a computer.

For instance, as shown in FIG. 6, a conventional laser beam printer 53 comprises: a printer engine 51 to actually print an image onto a photo sensitive drum on the basis of pixel data; and a printer controller 52 connected to the printer engine 51. The printer controller 52 receives code data which is sent from an external host computer 54 and produces page information consisting of pixel data on the basis of the code data and sequentially sends the pixel data to the printer engine 51. The host computer 54 loads one kind of application software from a floppy disk 55 having a number of kinds of application softwares and actuates a program of the application software. For instance, if a color image process is executed by the application software, the user can produce many multicolor information and store such.

FIGS. 7A and 7B show a construction of a signal processing circuit of the printer controller 52 and the transfer order of signals.

As shown in FIG. 7A, one of an R (red signal 4, a G (green) signal 5, and a B (blue) signal 6 as image signals from the host computer 54 is sequentially selected by a switching control circuit 2. The selected image signals are converted into an M (magenta) signal 8, a C (cyan) signal 9, and a Y (yellow) signal 10 as printing signals by a color conversion processing circuit 3 and are supplied to the printer engine 51. The converted M, C, and Y signals are further compared with signal information to produce a Bk (black) signal (not shown) by a Bk generation circuit 15, so that a Bk printing signal is generated and stored into a page memory 1.

That is, as shown in FIG. 7B, the R signal 4 is converted by the color conversion processing circuit 3 and the M signal 8 is output. After that, the R signal 4 is again selected. Then, the R signal 4 is converted by the color conversion processing circuit 3 and the Y signal 10 is generated. As mentioned above, the R signal 4, G signal 5, and B signal 6 are sequentially selected by the switching control circuit 2 and converted by the color conversion processing circuit 3 and all of the M signal 8, C signal 9, and Y signal 10 are generated. After that, the data in the page memory 1 is generated as a Bk signal 11. The developing order of the image signal at this time is set in a manner such that as shown in FIG. 7B, RGB signals 20 from the host computer 54 are transferred every picture plane (i.e. one frame of a picture) to the color conversion processing circuit 3 six times. That is, the signals are transferred frame-sequentially. In accordance with the transfer of the RGB signals, output signals 21 of Y, M, C, and Bk are transmitted to the printer engine 51 seven times.

As mentioned above, hitherto, by sequentially switching the R, G, and B signals every picture plane and converting into the Y, M, C, and Bk signals and generating, the multicolor image process by a small memory capacity is realized.

However, in the printer controller of the conventional multicolor recording apparatus which receives multicolor image signals from the host apparatus such as a host computer or the like as mentioned above and converts into the printing signals, the image signals from the host apparatus are requested a plurality of times and image process are successively executed instead of using a method whereby all of the image signals from the host apparatus are stored into the buffer memory in a lump and the data contents of the memory are sequentially read out and image processed. Therefore, if a communication error is generated during the transmission or upon reception on the printer side, there is a problem such that a multicolor image which was requested from the host apparatus cannot be formed.

Even if a retransmission is requested in the case where such a communication error was generated, the image data is not always properly received by such a request.

If the image data is printed out in a state in which the image data is insufficient, it is impossible to clearly distinguish whether the printout image is an image which should inherently be transmitted or an image due to the communication error.

On the other hand, assuming that a reproducing process is not executed to a part of the image data due to a communication error, transmission and reception of an image must be again executed from the beginning even for an image such as a picture in which it is sufficient that the outline of the image can be understood, so that a communicating efficiency fairly deteriorates.

Such a problem is important, particularly, in the case of color image communication in which a plurality of color component signals are transmitted and received.

A technique such that a predetermined mark is inserted into an image to be reproduced when a communication error of a black and white image was generated has been disclosed in U.S. Pat. No. 4,814,892. However, the above technique doesn't handle a color image and is still insufficient to solve the problems as mentioned above.

SUMMARY OF THE INVENTION

It is an object of the invention to solve the foregoing problems.

Another object of the invention is to provide an image processing apparatus which can reproduce a good image even if a communication error was generated.

According to the invention to solve the above object, there is disclosed an image processing apparatus comprising: receiving means for receiving image signals of a plurality of colors, in which the image signals are received for every color by an amount of one image formation unit; detecting means for detecting whether the image signals have properly been received by the receiving means or not; and image forming means for forming a color image on the basis of the image signals; wherein the image forming process by the image forming means is executed in accordance with the result of the detection by the detecting means.

On the other hand, there is also disclosed an image processing apparatus comprising: receiving means for receiving image signals of a plurality of colors, in which the image signals are received for every color by an amount of one image formation unit; detecting means for detecting whether the image signals have properly been received by the receiving means or not; and control means for requesting a retransmission of the image signals in accordance with the result of the detection by the detecting means.

Another object of the invention is to provide an image processing apparatus which can easily recognize a communication error.

According to the invention to solve the above object, there is disclosed an image processing apparatus comprising: receiving means for receiving image signals of a plurality of colors, in which the image signals are received for every color by an amount of one image formation unit; detecting means for detecting whether the image signals have properly been received by the receiving means or not; rand image forming means for forming a color image on the basis of the image signals; wherein the result of the detection by the detecting means is displayed in the image which is formed by the image forming means.

Still another object of the invention is to provide an image processing apparatus with a simple construction.

Further another object of the invention is to provide a recording apparatus having an intelligent function.

The above and other objects and features of the present invention will become apparent from the following detailed description and the appended claims with reference to the accompanying drawings.

BRIEF DESCRIPTION OF THE DRAWINGS

FIGS. 2A–2E comprise a flowchart showing a processing procedure of a communication error detection circuit in FIG. 1;

FIGS. 5A–5C comprise a flowchart showing a processing procedure of a communication error detection circuit in the embodiment of FIG. 4;

DETAILED DESCRIPTION OF THE PREFERRED EMBODIMENTS

Embodiments of the invention will be described in detail hereinbelow with reference to the drawings.

<First embodiment>

Figure 1:
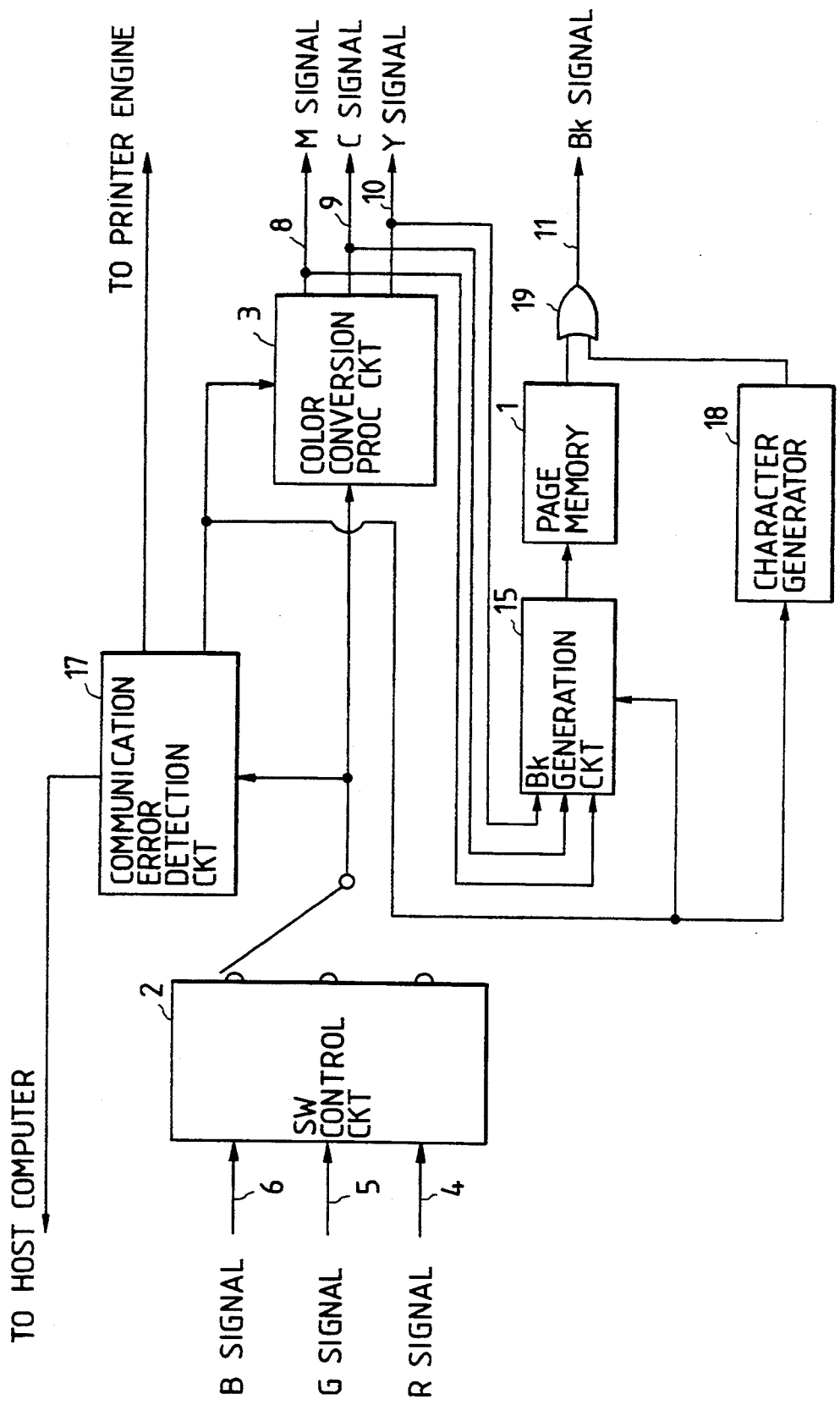
FIG. 1 is a block diagram showing a construction of a signal processing circuit of a printer controller in a multicolor recording apparatus according to the first embodiment of the invention.

FIG. 1 shows a circuit construction of a printer controller in a multicolor recording apparatus according to the first embodiment of the invention. In the diagram, the switching control circuit 2 sequentially switches the R signal 4, G signal 5, and B signal 6 as color information signals in the image signals from a host computer (not shown) every picture plane. The color conversion processing circuit 3 resolves the color information signals into the respective color components and converts such into the M signal 8, C signal 9, and Y signal 10. The M signal 8, C signal 9, and Y signal 10 which were converted by the color conversion processing circuit 3 are compared with the signal information to produce the Bk signal by the Bk generation circuit 15. Only the black component information obtained as a result of the comparison is stored into the page memory 1.

The Bk generation circuit 15 detects-the minimum value among the M, Y, and C signals and generates the detected minimum value as a Bk signal to the page memory 1. Generally, undercolor removing (UCR)-processes to eliminate the value of the Bk signal from the color component signals of M, Y, and C are inherently executed. However, in the embodiment, such UCR processes are omitted for simplicity of the circuit construction. On the other hand, the black component of the image can be emphasized by not eliminating the value of the Bk signal and an effect such that a clear image of a high contrast can be formed is also obtained.

Reference numeral 17 denotes a communication error detection circuit for detecting a communication error in the R signal 4, G signal 5, and B signal 6 as color information signals in the image signals from the host computer. If a communication error was detected, processes are executed as will be explained hereinlater.

Reference numeral 18 denotes a character generator which is constructed by an ROM. If a communication error was detected, the character generator 18 sends a character pattern to an OR circuit 19 and forms a latent image so as to add-on predetermined characters onto a recording medium, thereby displaying the error. The OR circuit can be also arranged between the Bk generation circuit 15 and the page memory 1.

The R signal 4, G signal 5, and B signal 6 as color information signals which were transmitted from the host computer (not shown) are sequentially switched every picture plane (i.e. every one frame of the picture) by the switching control circuit 2 in accordance with the order of R, G, and B, so that signals are transferred frame-sequentially. If the first color information signal, for instance, the R signal 4, is selected by the switching control circuit 2, the color conversion processing circuit 3 sends only the M signal 8 between the M signal 8 and Y signal 10 which were converted as a printing color signal to the printer engine, thereby allowing a first latent image to be formed by the M signal 8. On the other hand, the M signal 8 is also supplied to the Bk generation circuit 15 and is held as comparison information to produce the Bk signal by the Bk generation circuit 15 and is also stored into the page memory 1.

After the formation of the first latent image was finished in the printer engine, the switching control circuit 2 again selects the R signal as a second color information signal, that is, requests a retransmission of the image signals from the host computer. In a manner similar to the above, only the Y signal 10 between the M signal 8 and Y signal 10 which were converted is generated, a second latent image is formed in the printer engine, and color information to produce the Bk signal is sent to the Bk generation circuit 15.

In the Bk generation circuit 15, the M data obtained from the first color information signal and held is compared with the Y data derived from the second color information signal. When the Y data which was newly supplied is smaller than the M data, the Y data is held in place of the M data and the data in the page memory 1 is rewritten from the M data to the Y data.

As mentioned above, the color information signals are selected and the signal processes are sequentially executed in accordance with the order such as formation of the M signal from the first color information signal (R), formation of the Y signal from the second color information signal (R), formation of the C signal from the third color information signal (G), formation of the Y signal from the fourth color information signal (G), formation of the M signal from the fifth color information signal (B), and formation of the C signal from the sixth color information signal (B). The above processes are executed until a sixth latent image is formed. After completion of the formation of the sixth latent image, the image signal in the page memory 1 is supplied as a Bk signal 11 to the printer engine, thereby allowing a seventh latent image to be formed. After completion of the formation of the seventh latent image, the latent images formed on a photo sensitive drum (not shown) of the printer engine are copy transferred and fixed onto a recording paper in a lump through color toners, thereby forming a multicolor image onto the recording paper.

Figure 2B:
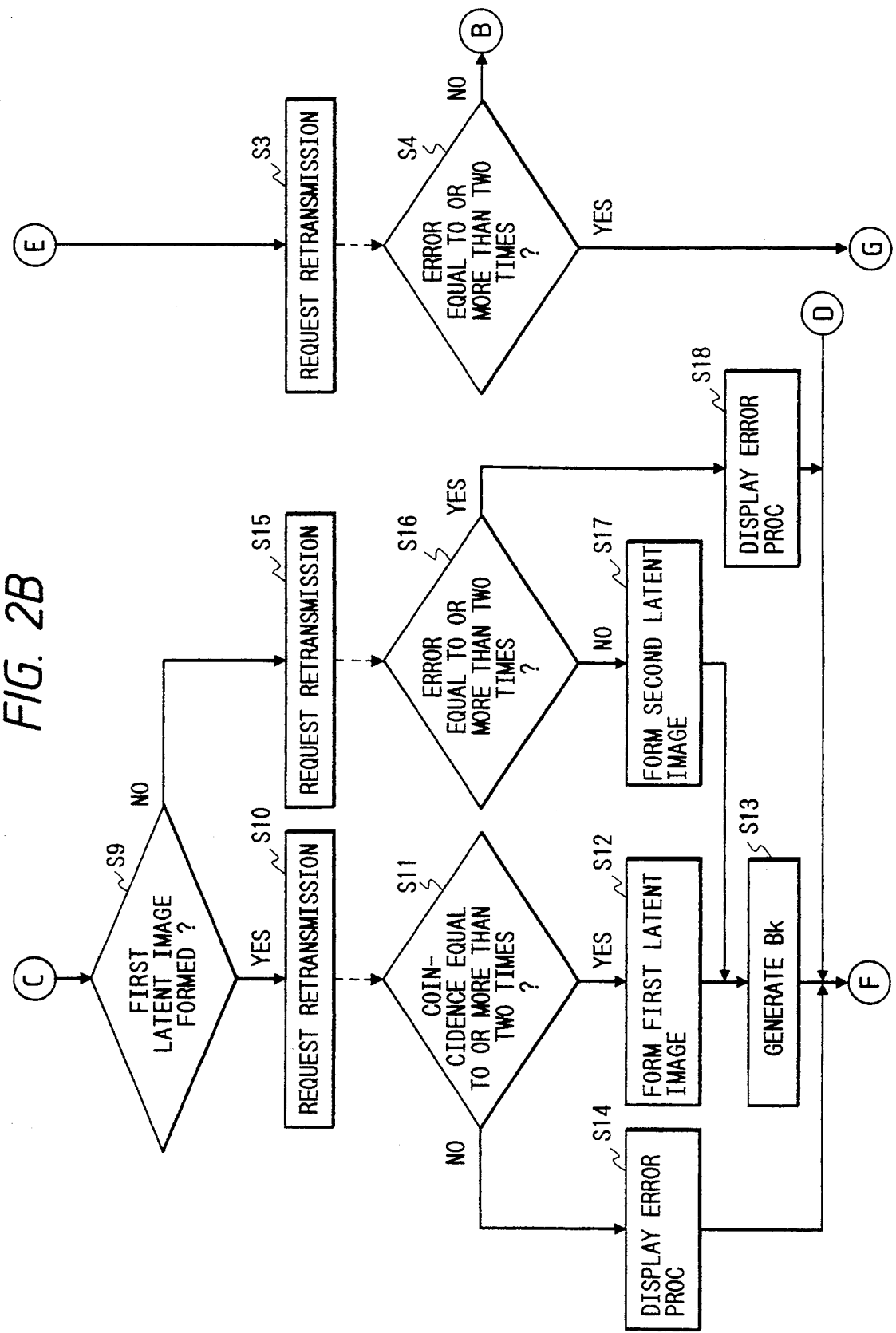
Figure 2D:
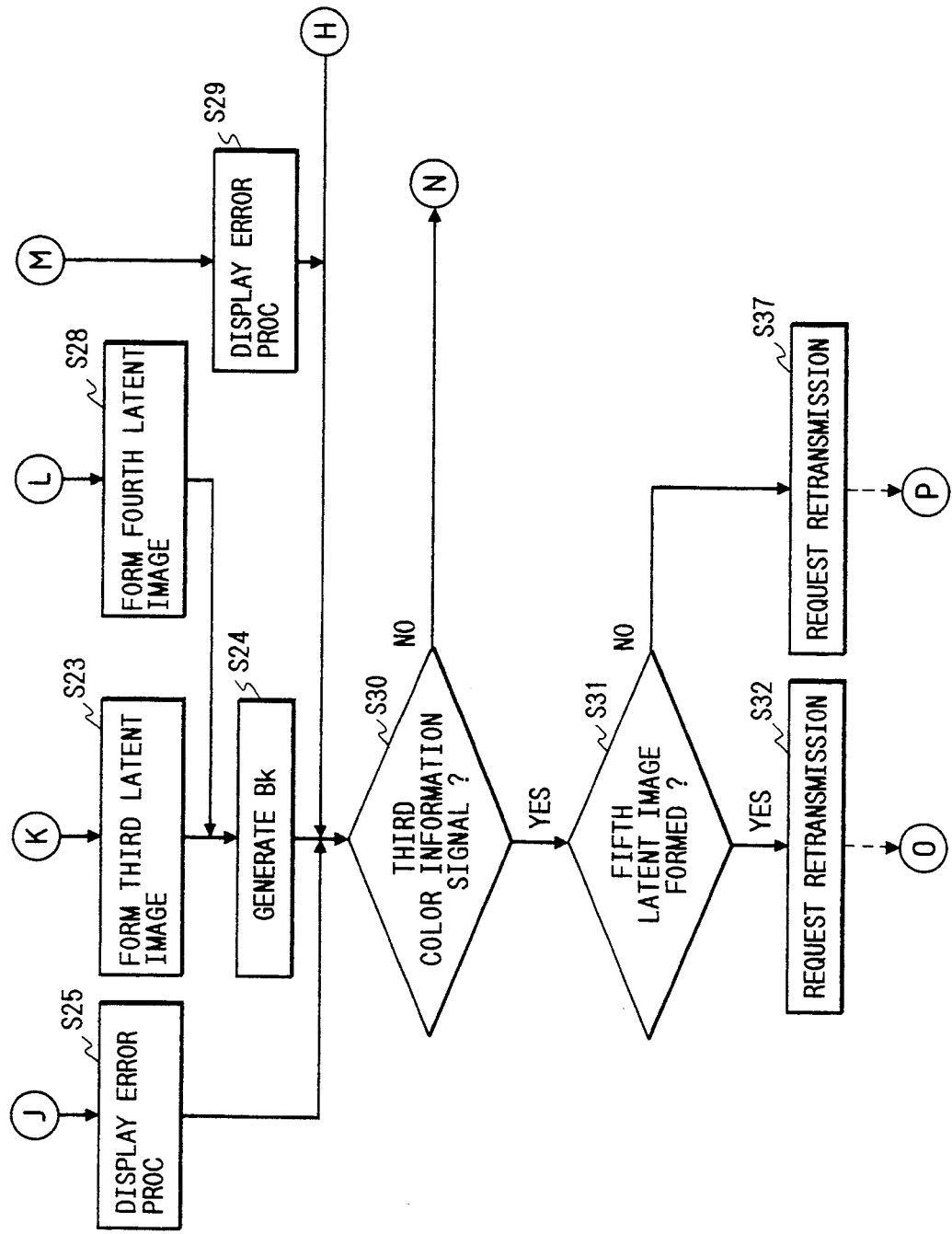
Figure 2E:
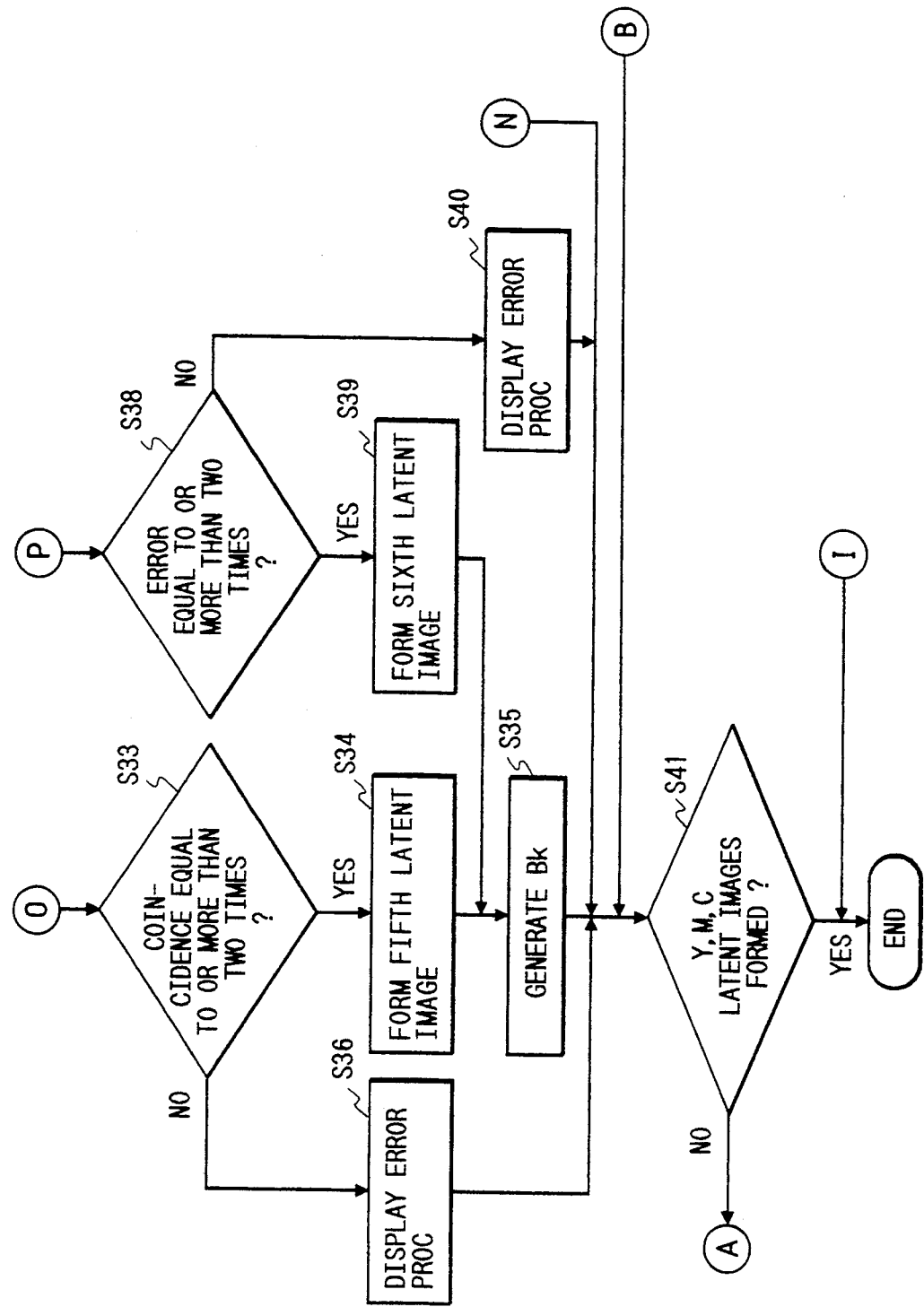

The communication error detection circuit 17 detects the color information signal every time the latent image is formed. FIG. 2 shows an example of a processing procedure of the communication error detection circuit 17. As shown in the diagram, after the color information signal was selected by the switching control circuit 2, the communication error detection circuit 17 first checks the presence or absence of the detection of a communication error (step S1) by, for instance, discriminating whether a predetermined amount of data has been received or not. If no communication error is detected, the ordinary latent image forming process is executed (step S41). If a communication error has been detected, a check is then made to see if the processing mode relates to a mode before the formation of the latent image or after the formation of the latent image (step S2). In accordance with the result of the discrimination in step S2, different processes as will be explained hereinbelow are performed.

In the case of the communication error before the formation of the latent image, a retransmission of the same signal is requested to the host computer (step S3). If no communication error is found out in the color information signal or even when a communication error was generated, if no communication error exists after the retransmission was requested at the second time (step S4), the present color information signal is used, thereby allowing the first latent image to be formed (step S41).

Figure 3A:
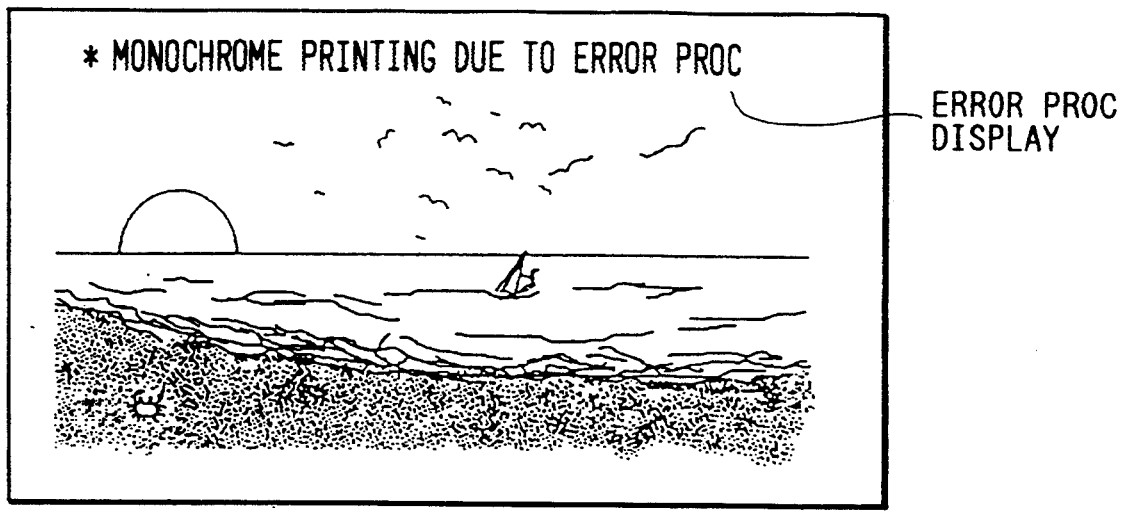
FIGS. 3A and 3B are plan views showing practical examples of the error processing display in the flowchart of FIG. 2.

In the case where the communication error exists even after the retransmission was requested at the second time in step S4, that is, if the communication error was generated two or more times, a monochrome process is executed (step S5). In the monochrome process, only the signal component to produce the Bk signal which was developed from the above color information signal is stored into the page memory 1. Then, the image signal stored in the page memory 1 is supplied as a Bk signal 11 to the printer engine. The latent image is formed on the basis of the Bk signal 11 by the printer engine (step S6). As shown in FIG. 3A, a comment displaying process to display a message indicative of the monochrome error process is also performed (step S7), thereby completing the formation of the latent image.

Figure 3B:
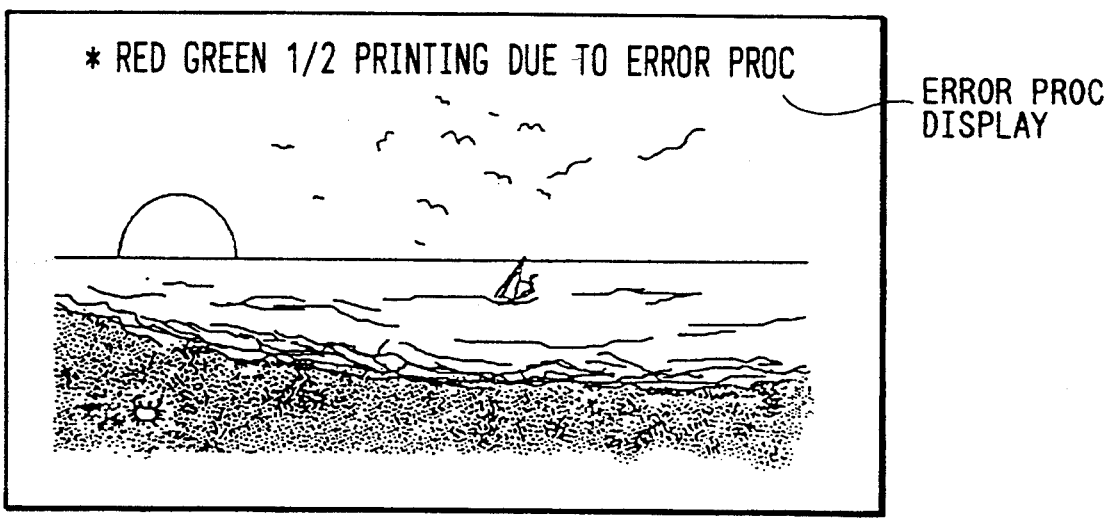

In step S2, in the case of the communication error after the formation of the latent image, if the signal is the first color information signal (step S8) and the above information signal after the request of the retransmission is a signal to form the first latent image (step S9), the retransmission of the color information signal is requested at the second time to the host computer (step S10). The first latent image is formed by the printer engine (step S12) by the color information signal in which the number of coincidence times is equal to or larger than two times (step S11). The signal component to form the Bk signal is stored into the page memory 1 (step S13). The control processes in steps S12 and S13 are not executed for the signals other than the signal in which the number of coincidence times is equal to or larger than two times in step S11 but the formation of a latent image to display a message indicative of the non-execution of the processes as shown in FIG. 3B is instructed to the printer engine (step S14).

If it is determined in step S9 that the signal is the color information signal to form the second latent image, the retransmission is requested at the second time to the host computer (step S15). If a mismatch (or an error) of the color information signal of two or more times is not detected (step S16), the second latent image is formed by the printer engine (step S17). The signal component to form the Bk signal is stored into the page memory 1 (step S13). In step S16, if an error in which the number of mismatch times is equal to or larger than two times exists, the process in step S17 is not performed but the formation of the latent image to display a message indicative of the non-execution of the processes as shown in FIG. 3B is instructed to the printer engine (step S18).

The processes similar to the foregoing processes are also sequentially executed to the second and third color information signals (steps S19 to S40).

As mentioned above, according to the embodiment, a communication error of the image signals from the host computer (not shown) is detected by the communication error detection circuit 17 and the processes are properly made different in accordance with the result of the discrimination regarding whether the processing mode is a mode before the image formation or a mode after the image formation. Therefore, even if a communication error was generated, a multicolor image can be formed.

<Second embodiment>

Figure 4:
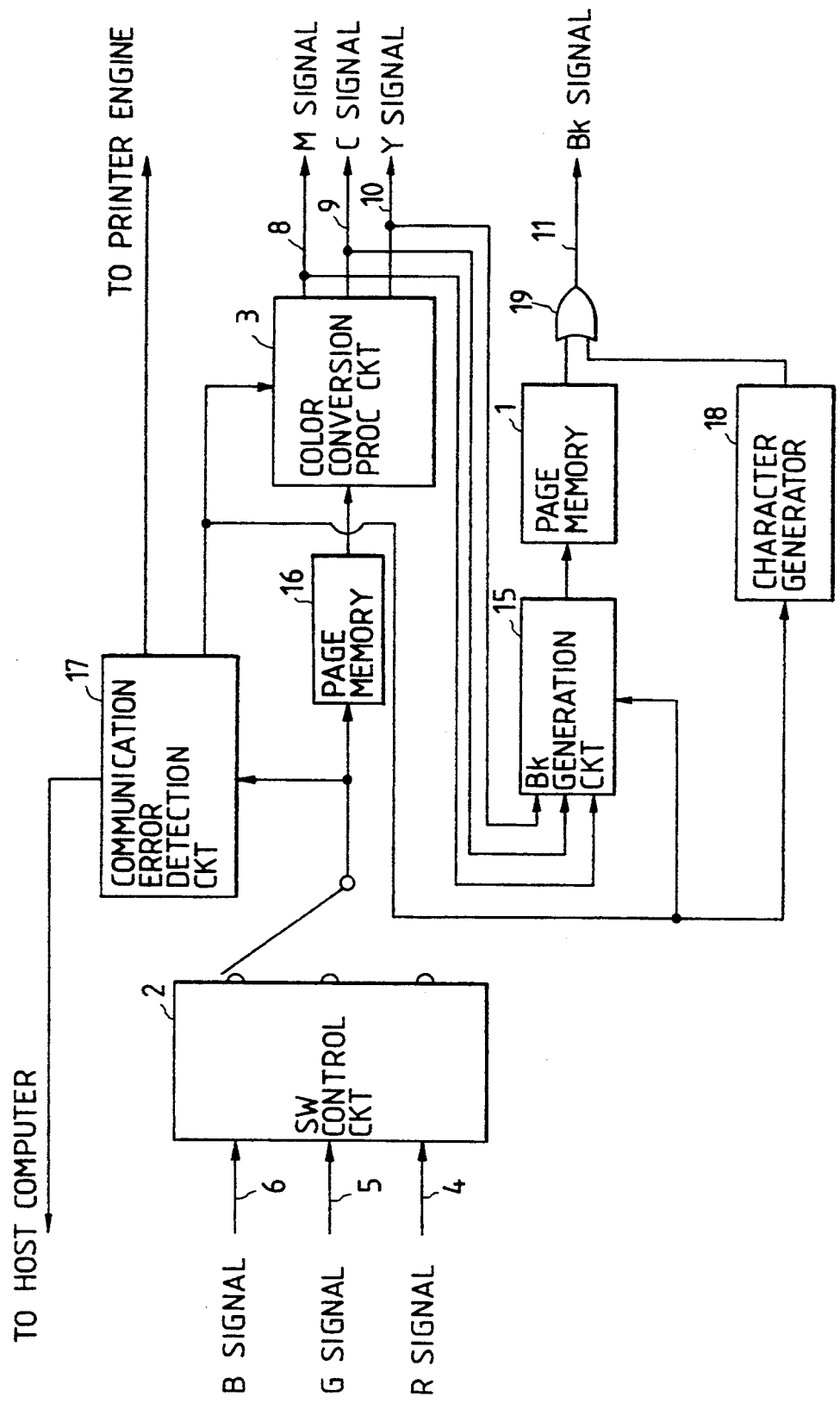
FIG. 4 is a block diagram showing a construction of a signal processing circuit of a printer controller in a multicolor recording apparatus according to the second embodiment of the invention.

FIG. 4 shows a circuit construction of a printer controller in a multicolor recording apparatus according to the second embodiment of the invention. In the diagram, the circuits and components having the same functions as those shown in FIG. 1 are designated by the same reference numerals. In FIG. 4, reference numeral 16 denotes a page memory to temporarily store the color information signal selected by the switching control circuit 2.

According to the first embodiment of the invention mentioned above, the first color information signal, for instance, the R signal 4 selected by the switching control circuit 2, is converted into the printing signal, for example, the M signal 8 by the color conversion processing circuit 3. The M signal 8 is generated from the color conversion processing circuit 3. Then, the same signal is again selected by the switching control circuit 2 and converted into another printing signal, for instance, the Y signal 10 by the color conversion processing circuit 3 and the Y signal 10 is generated. After that, the signal switching and converting processes are also similarly sequentially executed to the second and third color information signals by the switching control circuit 2 and the color conversion processing circuit 3. A detecting process of a communication error is executed by the communication error detection circuit 17 every time those processes are performed. However, in this case, although there is an advantage such that it is sufficient to use a small memory capacity, if a communication error was detected in the first color information signal, the accurate first color information signal cannot be reproduced but there is a fear such that a color fluctuation occurs.

On the other hand, according to the second embodiment of the invention, to prevent the occurrence of such a color fluctuation, a memory capacity larger than that in the foregoing first embodiment is used, that is, the page memory 16 having a memory capacity of one page is used as a buffer memory.

First, in the second embodiment, the first color information signal, e.g., the R signal 4 is selected by the switching control circuit 2 and stored into the page memory 16 at the front page. The color conversion processing circuit 3 converts the R signal 4 stored in the page memory 16 into the printing color signal and sequentially generates. For example, if the M signal 8 is supplied, the color conversion processing circuit 3 again converts the R signal stored in the page memory 16 and generates the Y signal 10 at this time. The data of the color component to form a Bk signal is stored into the page memory 1 at the post stage from the Bk generation circuit 15.

The selecting, storing, and converting processes are also sequentially executed to the second and third color information signals in a manner similar to the first color information signal. After the printing color signals were generated, the image signal in the page memory 1 is generated as the Bk signal 11.

Figure 5B:
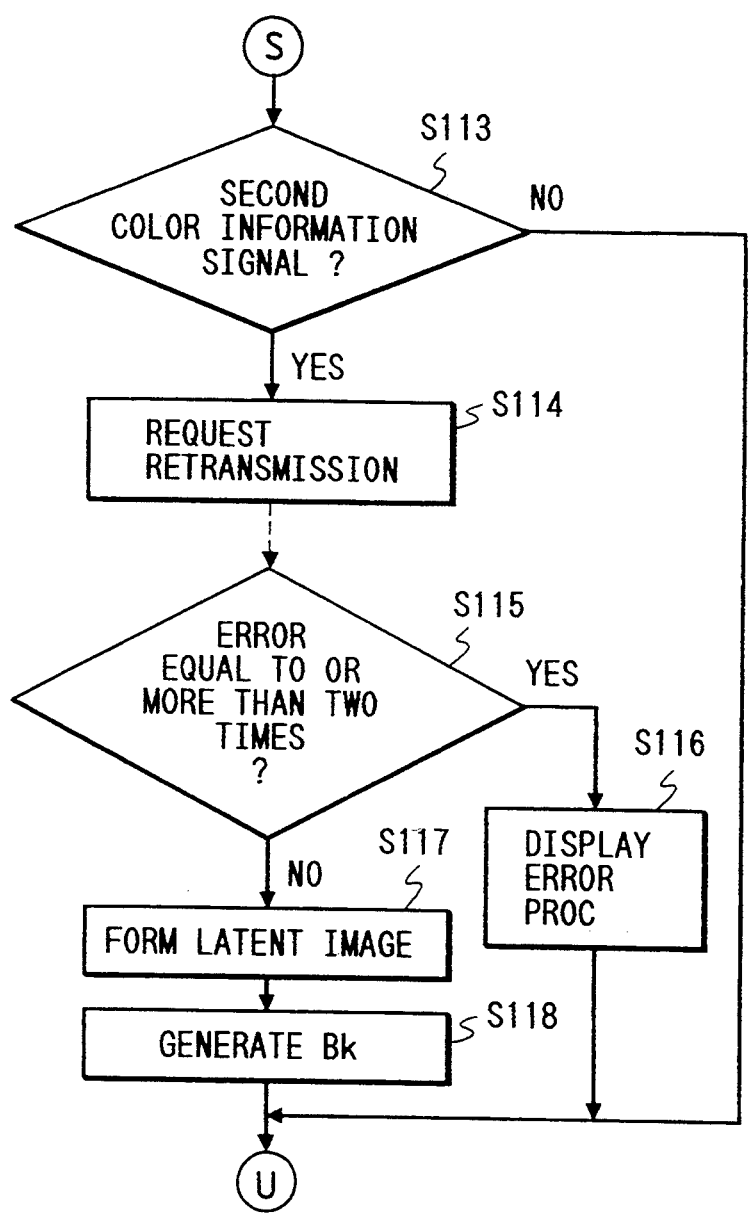
Figure 5C:
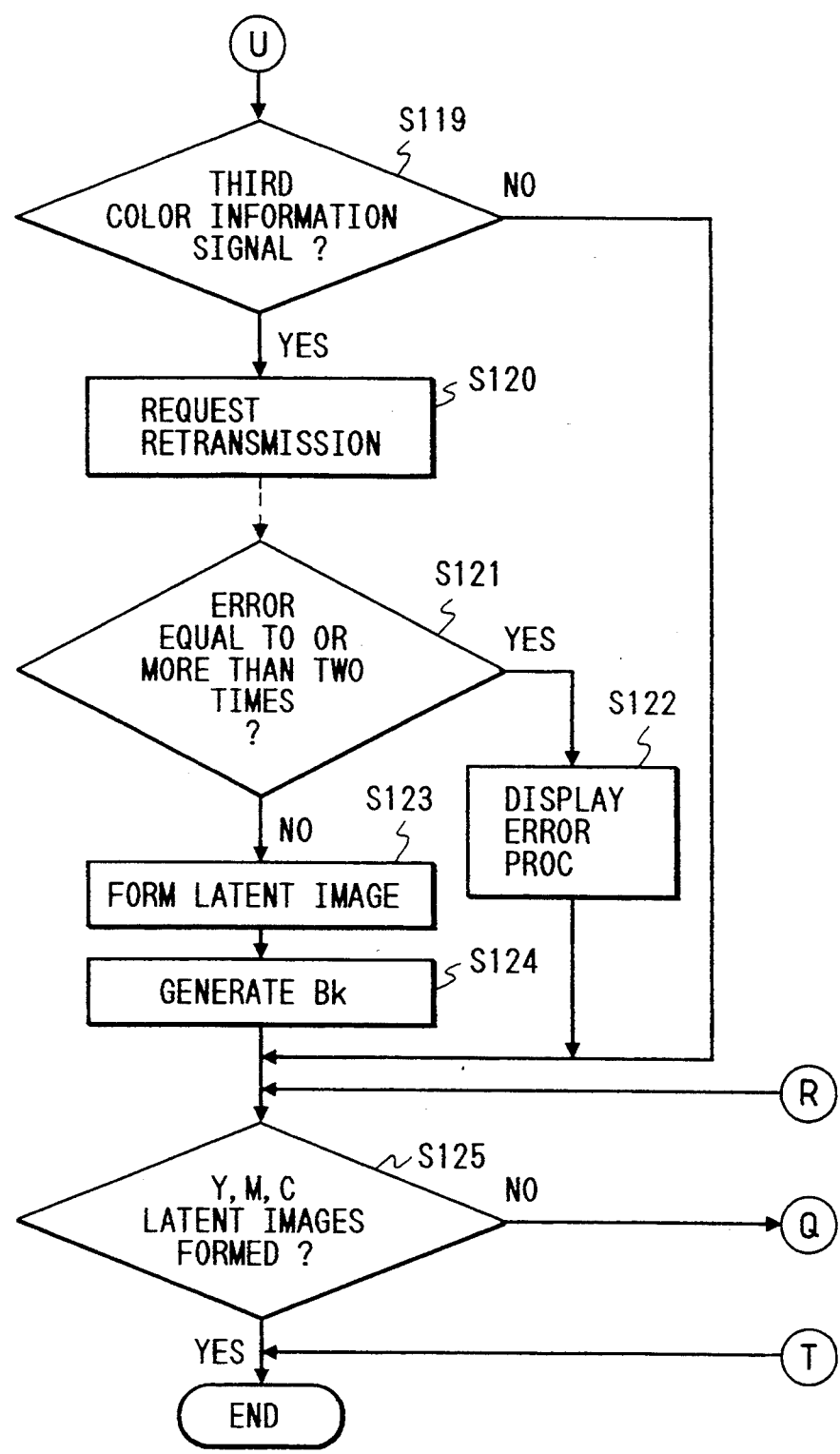
Figure 6:
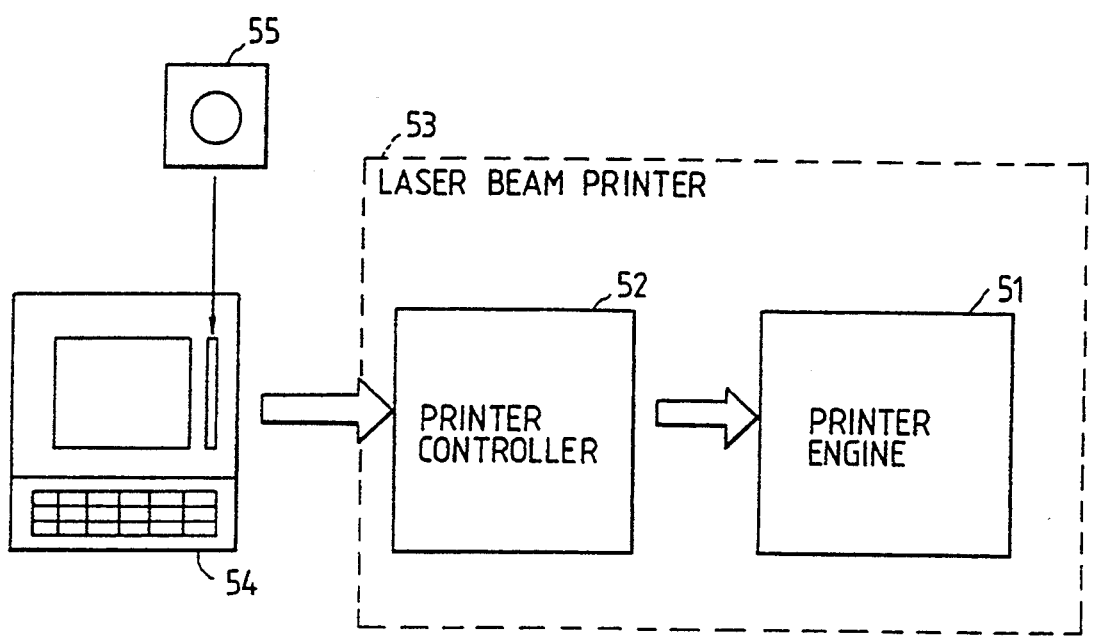
FIG. 6 is a block diagram showing a construction of a general laser beam printer.
Figure 7A:
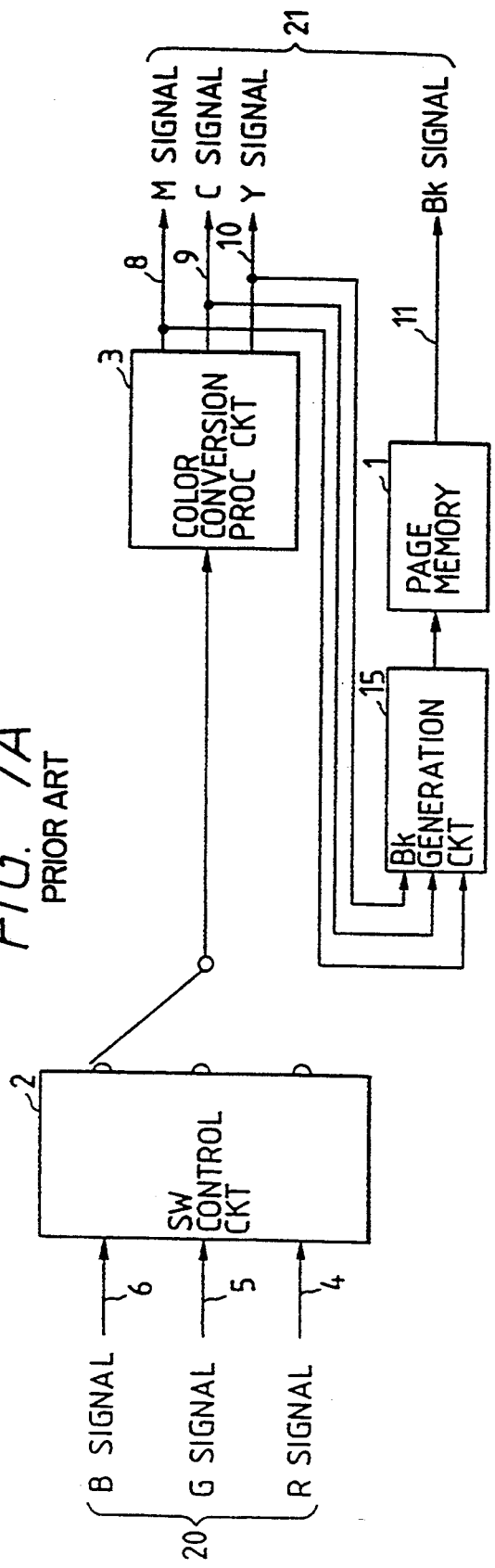
FIG. 7A is a block diagram showing a circuit construction of a conventional printer controller.
Figure 7B:
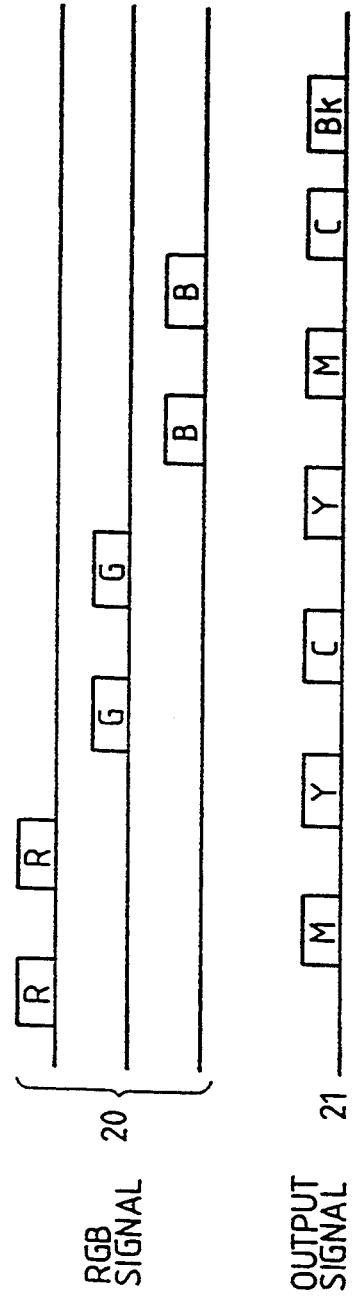
FIG. 7B is a timing chart showing a signal processing operation of the printer controller of FIG. 7A.

FIG. 5 shows a communication error detection processing procedure in the second embodiment of the communication error detection circuit 17.

In the second embodiment, a processing procedure which is executed in the case where a communication error has been detected before the latent image is formed is the same as the processing procedure shown in FIG. 2 according to the first embodiment (steps S101 to S106 and S125).

In the case where the communication error had been detected after the formation of the latent image, if a communication error which is equal to or larger than two times exists in the first color information signal which is retransmitted after the retransmission was requested (steps S101, S102, S107' to S109), the formation of the latent image to display an error process is instructed to the printer engine, thereby forming such a latent image (step S110). The process to form the latent image of the first color information signal is not executed.

If a communication error which is equal to or larger than two times doesn't exist in the first color information signal which is retransmitted after the retransmission was requested (step S109), the color information signal without an error is stored into the page memory 16 at the front stage and the stored signal is converted into the printing color signal by the color conversion processing circuit 3 and supplied to the printer engine (step S111). The data component to produce a Bk signal is stored into the page memory 1 at the post stage (step S112).

The processes such as a communication error detection and the like are also sequentially executed to the second and third color information signals (steps S113 to S118, S119 to S124, S125). As mentioned above, in the second embodiment, the page memory 16 to temporarily store the color information signal in the image signals from the host computer (not shown) has been provided. Therefore, even if a communication error was generated, in the communication error detection circuit 17, there is no fear of occurrence of the color fluctuation and a multicolor image can be properly formed in accordance with the color information signals from the host computer.

<Third embodiment>

The third embodiment relates to an error process in the case of developing into pixel data and forming a color image in accordance with received character code data and a control command (or a control instruction) instead of receiving and printing out color image data (pixel data).

Figure 8:
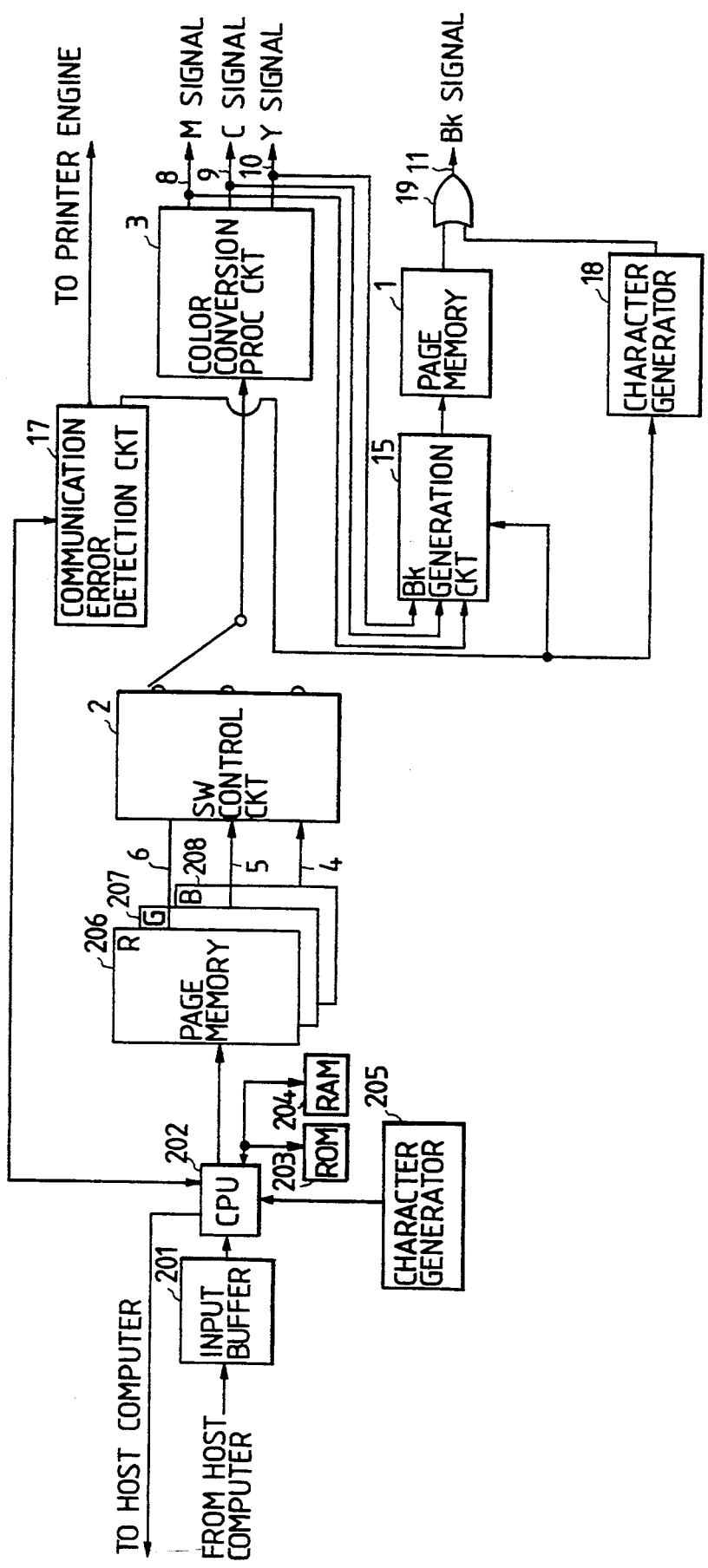
FIG. 8 is a block diagram showing a construction of a signal processing circuit of a printer controller in a multicolor recording apparatus according to the third embodiment of the invention.

FIG. 8 is a block constructional diagram of an apparatus of the third embodiment and shows the case where character code data and a control command (or a control instruction) which are sent from the host side such as a computer or the like are received and a character pattern is recorded by a printer such as a laser beam printer or the like.

In FIG. 8, reference numeral 201 denotes an input buffer to temporarily store information such as character code data to be received, painting command, and the like, and a control command (or a control instruction). A color designation command to designate the color of a character, a diagram, or the like to be expressed by the information such as character code, painting command, and the like is included in the control command. Reference numeral 202 denotes a CPU comprising a general microprocessor; 203 and ROM in which processing programs have been stored; 204 an RAM which is used as a working area; and 205 a character generator to generate a character dot pattern, a line pattern, or the like in accordance with the character code data and painting command. Reference numerals 206 to 208 denote page memories for storing information of one page of R (red), G (green), and B (blue) which were dot developed, respectively.

Reference numeral 2 denotes the switching control circuit for area-sequentially reading out the pixel images stored in the page memories 206 to 208. Reference numeral 17 denotes the communication error detection circuit to detect a communication error of at least one of the information and the control command which were extracted from the input buffer 201.

The other construction is substantially similar to that in FIG. 1.

Figure 11A:
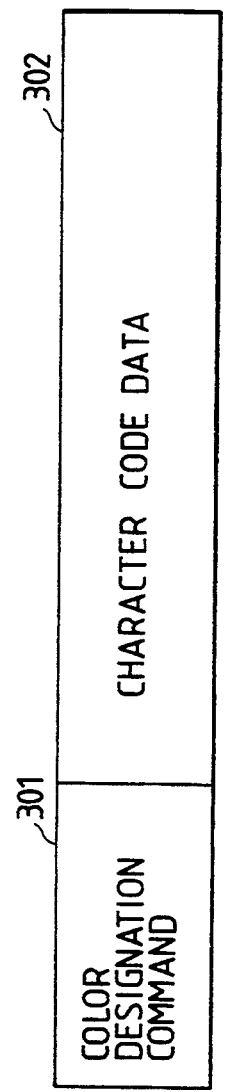
FIGS. 11A and 11B are diagrams showing examples of data formats of information and control commands which are received in the third embodiment.
Figure 11B:
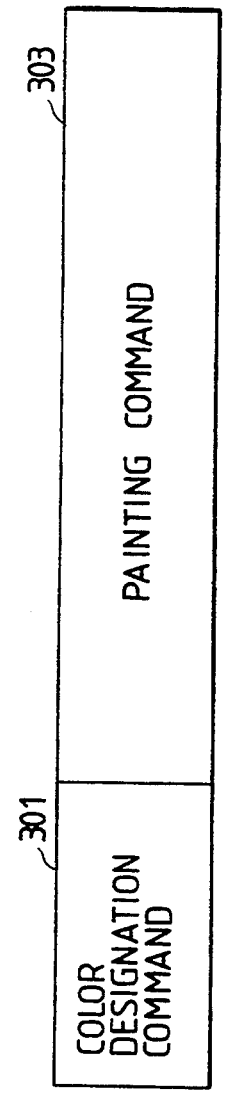

FIGS. 11A and 11B show examples of data formats of the information and control command which are received in the embodiment. FIG. 11A shows an example of a data format in the case of developing a color character. A color designation command 301 is first received. Character code data indicative of a character which is expressed by the color designated by the color designation command 301 is then received. The receiving order may be also reversed. FIG. 11B shows an example of a data format in the case of developing a color diagram. A painting command 303 is received in place of character code data 302 in FIG. 11A.

Figure 10:
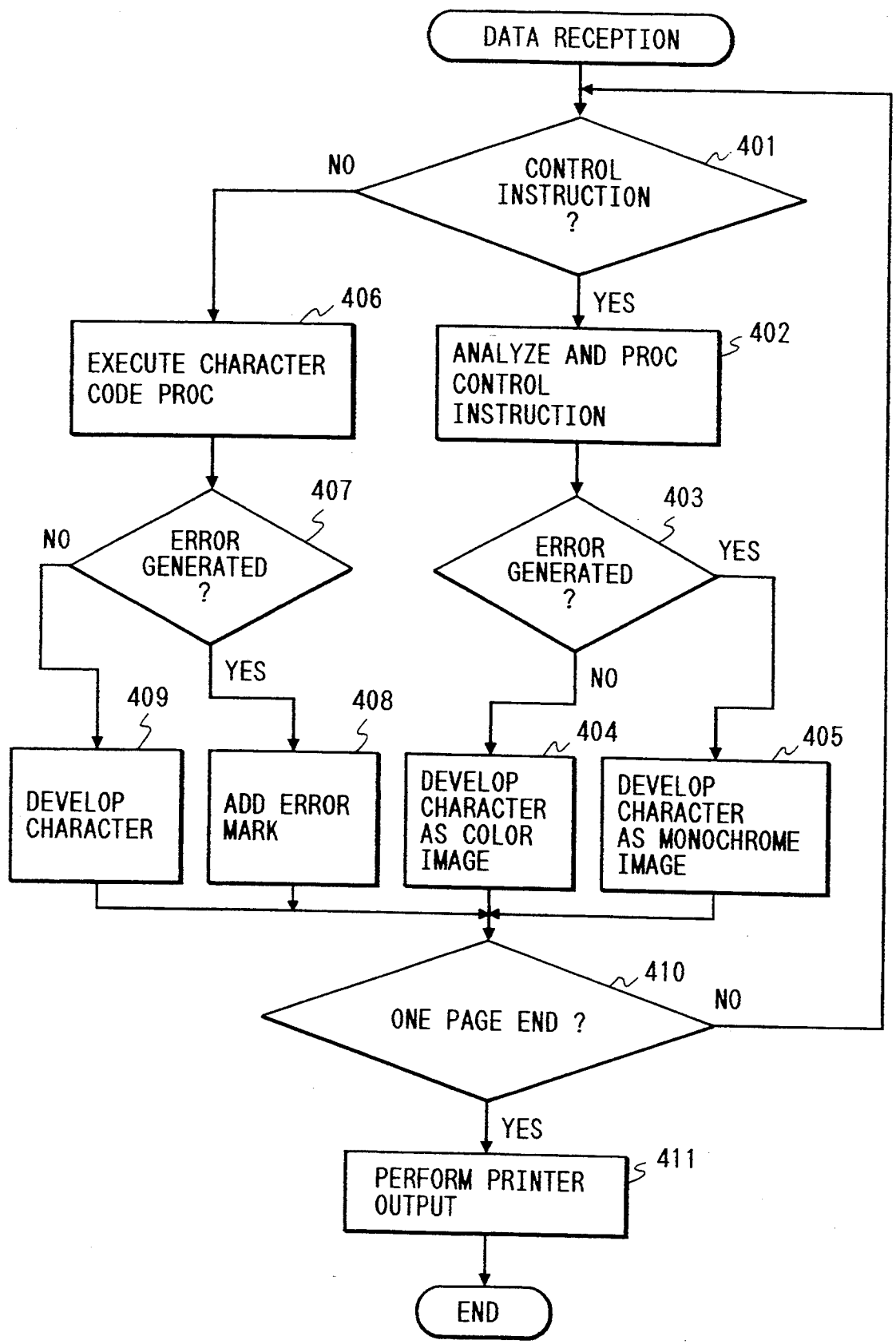
FIG. 10 is a flowchart showing a processing procedure in the third embodiment.

FIG. 10 is a diagram showing a flow of the processes according to the third embodiment.

Figure 9A:
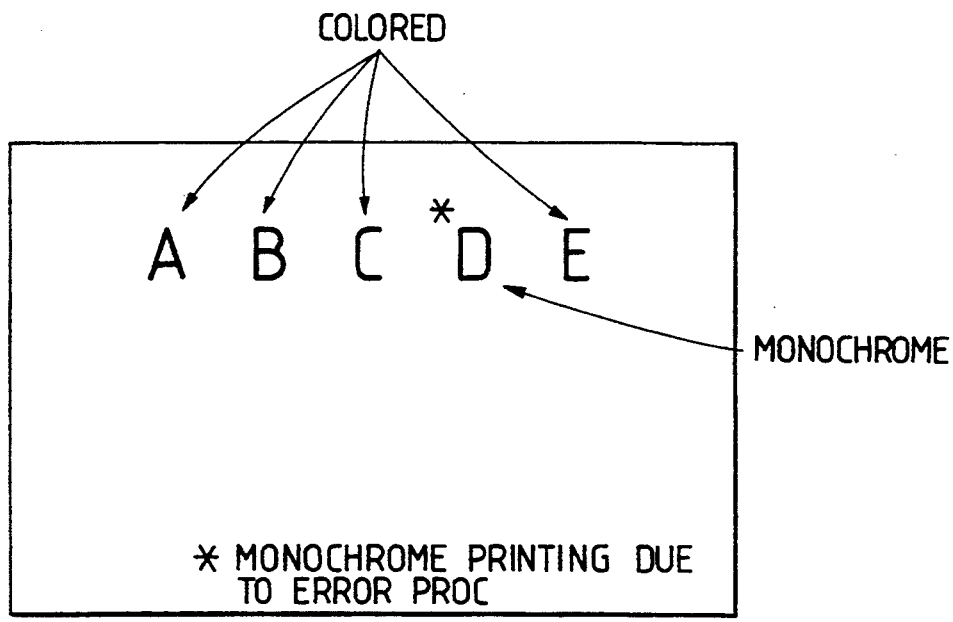
FIGS. 9A and 9B are diagrams showing practical examples of the error processing display in the third embodiment.

First, it is checked by the CPU 202 to see if objective data is a control instruction (command) or not (S401). If YES, the control instruction is analyzed (S402). A check is then made by the communication error detection circuit 17 to see if a communication error exists in the control instruction or not (S403). If YES, a character code or the like to be received next is developed as a monochrome image as shown in FIG. 9A and an error mark which was read out of the character generator 205 is added (S405). If no error exists in step S403, the received data is developed as a color image (S404).

Figure 9B:
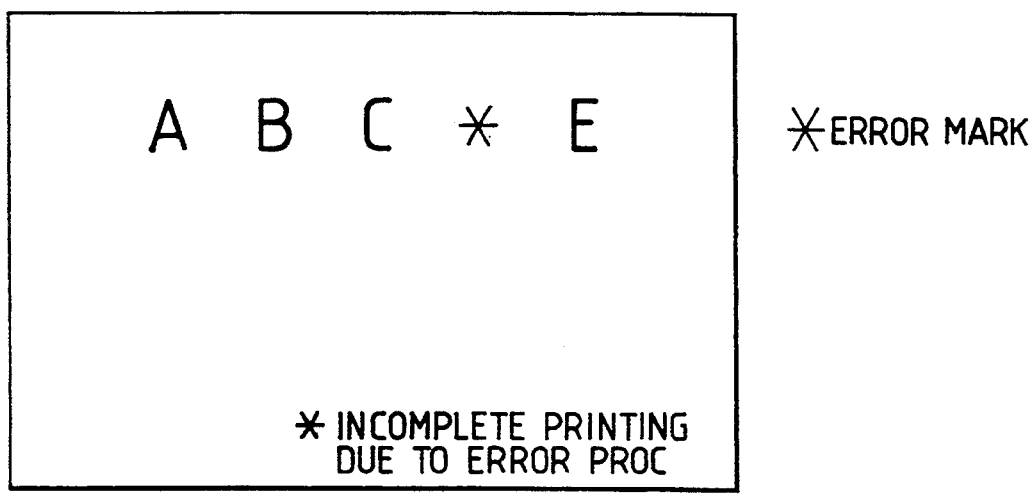

On the other hand, if the data is not the control instruction in step S401, a character code process is executed (S406). A check is then made to see if an error exists in the character code or not (S407). If YES, as shown in FIG. 9B, an error mark which was read out of the character generator 205 is developed to a position where the character should be printed (S408). If no error exists in step S407, a character which is expressed by the character code is developed (S409).

The above processes are repeated by an amount of one page (S410). An image is recorded by the printer (S411).

If an error exists in at least one of the control instruction and the information such as a character code or the like, in order to display an error message as shown in the lower portion in each of FIGS. 9A and 9B onto the recording medium, predetermined characters are generated from the character generator 18 and are added-on to the Bk signal.

Although the above embodiment has been described with respect to the color laser beam printer to area sequentially form an image in accordance with the order of Y, M, C, and Bk as an example, the output means is not limited to such an LBP but a color ink jet printer, a color dot printer, a color thermal copy transfer printer, etc. can be also used.

Particularly, the ink jet printer includes a recording apparatus of what is called a bubble jet (BJ) type which uses a head of the type in which a liquid droplet is emitted by causing a film boiling by a heat energy.

On the other hand, in the above embodiment, an error message has been printed onto a recording medium. However, an error message can be also displayed by display means such as an LCD or the like. An error can be also warned by a voice.

An error message can be also printed by a toner of M (magenta), C (cyan), or Y (yellow) instead of B (black).

In the embodiment, the parallel input signals R, G, and B have sequentially been selected. However, the host computer can be also controlled so that the input for signals can be area sequentially input every color.

The copy transferring and fixing processes can be also executed for every formation of the latent image instead of executing them in a lump.

As described above, according to the invention, even in the case where a communication error was generated, a good multicolor image which is required from the host computer can be also formed.

Particularly, according to the embodiment of the invention, when a communication error was detected by the communication error detecting means, a corresponding recovery process is executed in accordance with the result of the discrimination regarding whether such an error detection timing is before or after the formation of the latent image. Therefore, even if a communication error was generated, a multicolor image which is required from the host apparatus can be properly formed.

The present invention is not limited to the foregoing embodiments but many modifications and variations are possible within the spirit and scope of the appended claims of the invention.

I claim:

1. An image processing apparatus comprising:
   a) receiving means for receiving a plurality of color component signals;
   b) detecting means for detecting whether the color component signals have properly been received by said receiving means; and
   c) output means for outputting a plurality of recording signals, including a black signal, to image forming means for forming a plurality of color component images frame-sequentially, wherein said image forming means, last of all, forms a black image, and the result of the detection by said detecting means is displayed in the black image which is, last of all, formed by said image forming means even if the result of the detection is obtained while said image forming means is forming a color component image other than the black image.

2. An apparatus according to claim 1, wherein said receiving means receives the color component signals of red, green, and blue.

3. An apparatus according to claim 1, further comprising converting means for converting color components of the received color component signals.

4. An apparatus according to claim 1, wherein said color component signals are received in a unit of one frame of a picture.

5. An apparatus according to claim 1, wherein said detecting means includes means for requesting retransmission of the color component signals in accordance with a detection result.

6. An apparatus according to claim 1, wherein a monochrome image is formed by the image forming means when an error is detected by the detecting means.

7. An apparatus according to claim 1, wherein the image forming means comprises a laser beam printer.

8. An apparatus according to claim 1, wherein the image forming means comprises a printer of a bubble jet type.

9. An image processing apparatus comprising:
   a) receiving means for receiving a plurality of color component signals, the color component signals being received frame-sequentially for each color component;

b) detecting means for detecting whether the color component signals have properly been received by said receiving means;

c) output means for outputting a recording signal to image forming means for forming a latent image on a medium on the basis of the color component signals and transferring the latent image to a recording medium;

d) judging means for judging whether said detecting means detects that at least one of the color component signals has not properly been received between plural latent image formings by said image forming means; and e) control means for controlling said image forming means in accordance with a judgement result of said judging means.

10. An apparatus according to claim 9, wherein said receiving means receives the color component signals of red, green, and blue.

11. An apparatus according to claim 9, further comprising converting means for converting color components of the received color component signals.

12. An apparatus according to claim 9, wherein said color component signals are received in a unit of one frame of a picture.

13. An apparatus according to claim 9, wherein said control means requests retransmission when an error is detected by said detecting means.

14. An apparatus according to claim 9, wherein the image forming means is a laser beam printer.

15. An image processing method comprising the steps of:

a) receiving a plurality of color component signals;

b) detecting whether the color component signals have been properly received in said receiving step; and c) forming a plurality of color component images frame-sequentially, on the basis of a plurality of recording signals, including a black signal, a black image being formed last of all, wherein a result of detection in said detecting step is displayed in the black image which is, last of all, formed in said image forming step even if the result of the detection is obtained while a color component image other than the black image is being formed.

16. An image processing method comprising the steps of:

a) receiving a plurality of color component signals, the color component signals being received frame-sequentially for each color component;

b) detecting whether the color component signals have been properly received in said receiving step;

c) forming a latent image on a medium on the basis of the color component signals and transferring the latent image to a recording medium;

d) judging whether said detecting step detects that at least one of the color component signals has not been properly received between plural latent image formings; and e) controlling image forming in accordance with the judgement result.

* * * * *

UNITED STATES PATENT AND TRADEMARK OFFICE
CERTIFICATE OF CORRECTION

PATENT NO. : 5,406,393
DATED : April 11, 1995
INVENTOR(S) : FUMIHIRO UENO

It is certified that error appears in the above-indentified patent and that said Letters Patent is hereby corrected as shown below:

ABSTRACT:

[57]

Line 4, "is" should read --are--.

COLUMN 3:

Line 26, "Further" should read --Further,--.

COLUMN 4:

Line 45, "OR" should read --OR--.
Line 60, delete "a" after "as".
Line 61, "signal" should read --signals--.
Line 62, "8.On" should read --8. On--.

UNITED STATES PATENT AND TRADEMARK OFFICE
CERTIFICATE OF CORRECTION

PATENT NO. : 5,406,393
DATED : April 11, 1995
INVENTOR(S) : FUMIHIRO UENO

It is certified that error appears in the above-indentified patent and that said Letters Patent is hereby corrected as shown below:

COLUMN 9:

Line 48, "to area" should read --area to--.

Signed and Sealed this

Eighteenth Day of July, 1995

Attest:

BRUCE LEHMAN

Attesting Officer

Commissioner of Patents and Trademarks